United States Patent [19]
Raad et al.

[11] Patent Number: 5,191,254
[45] Date of Patent: Mar. 2, 1993

[54] MINIMUM LENGTH, AIR COOLED AC GENERATOR ARRANGEMENT

[75] Inventors: Bernard A. Raad, Burbank, Calif.; Hong Lee, West Allenhurst, N.J.

[73] Assignee: Allied-Signal Inc., Morris Township, Morris County, N.J.

[21] Appl. No.: 762,192

[22] Filed: Sep. 19, 1991

[51] Int. Cl.⁵ .............................................. H02K 7/20
[52] U.S. Cl. ................................... 310/112; 310/114; 310/68 D
[58] Field of Search .................. 310/62, 63, 68 D, 90, 310/112, 114

[56] References Cited

U.S. PATENT DOCUMENTS

| | | | |
|---|---|---|---|
| 4,409,502 | 10/1983 | McCabria | 310/68 D |
| 4,443,723 | 4/1984 | Ohkubo | 310/62 |
| 4,670,677 | 6/1987 | Snider et al. | 310/68 D |
| 4,797,590 | 1/1989 | Raad et al. | 310/68 D |

Primary Examiner—Steven L. Stephan
Assistant Examiner—Matthew Nguyen
Attorney, Agent, or Firm—Donald B. Paschburg; Howard G. Massung

[57] ABSTRACT

An air-cooled ac generator arrangement is rearranged to take advantage of otherwise wasted space within the generator. The permanent magnet generator is moved to the drive end of the rotor where it is placed under the drive end side winding of the main armature. The permanent magnet generator field now obstructs the passage of air to the drive end bearing so a comparatively small air impeller is added in the otherwise void space between the permanent magnet generator and the main field. Ports are also added to the permanent magnet generator field hub to provide for the required air flow.

6 Claims, 5 Drawing Sheets

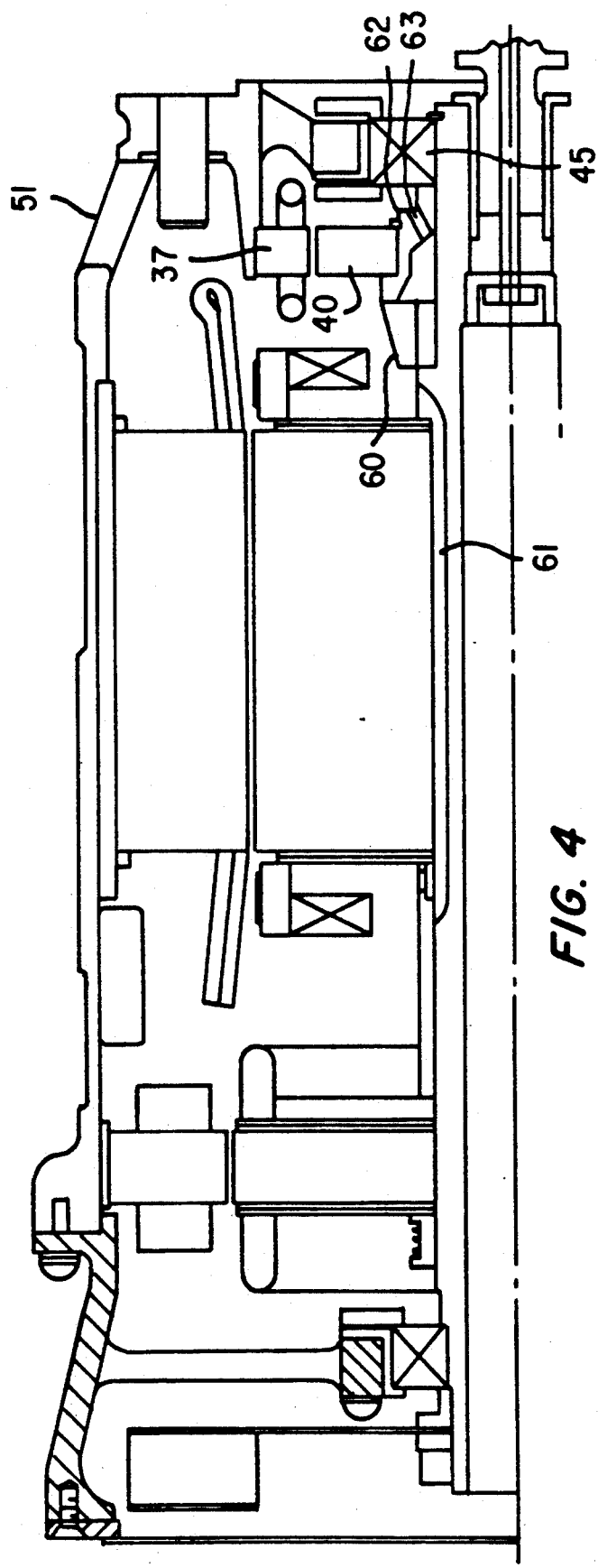

MINIMUM LENGTH, AIR COOLED AC GENERATOR ARRANGEMENT

BACKGROUND OF THE INVENTION

1. Field of the Invention

This invention relates to ac generator arrangements on board aircraft and more particularly to an improved minimum length ac generator arrangement which utilizes otherwise wasted space while still obtaining proper cooling.

2. Description of the Prior Art

Brushless ac generators used on board aircraft are generally self-exciting which means that they comprise three generators in one, placed in tandem, on a common shaft and within a common housing. When dealing with an air cooled generator, the internal arrangement of the ac generator has long been established mainly because the cooling air flow is normally unidirectional, being propelled through the unit by a single impeller or fan. However, this established arrangement usually results in a length penalty and since space can be at a premium in certain areas of an aircraft, a modified arrangement that utilizes empty spaces which are otherwise wasted would be a major improvement.

A modified arrangement which would take advantage of wasted space, however, would have cooling problems because the modified arrangement would restrict air flow and prevent air from impinging upon each heat producing component of the generator.

It is an object of the present invention to provide a minimum length, air cooled ac generator arrangement which takes advantage of otherwise wasted space on board the aircraft while still obtaining proper cooling.

SUMMARY OF THE INVENTION

The present invention provides for a minimum length, air cooled ac generator arrangement. Minimum length is obtained by modifying the original arrangement of three generators in one, placed in tandem. The permanent magnet generator is moved to the drive end of the rotor. Here the permanent magnet generator is placed under the drive end side winding of the main armature. A more efficient space utilization is thus achieved. However, because the permanent magnet generator field now obstructs the passage of air to the drive end bearing, the drive end bearing will overheat if no provisions are made to cool it. In order to obtain cooling for the drive end bearing, a comparatively small air impeller is added in the otherwise void space between the permanent magnet generator and the main field. Thus, with the inclusion of the air impeller, enough negative pressure is created at the drive end of the main field so that air is pulled through shaft channels and partially propelled under the permanent magnet generator hub, through ports, against the drive end bearing, and finally exits through the drive end housing vents.

BRIEF DESCRIPTION OF THE DRAWINGS

FIG. 4 illustrates a longitudinal cross-section layout of one embodiment of the present invention.

DETAILED DESCRIPTION OF THE INVENTION

Figure 1:
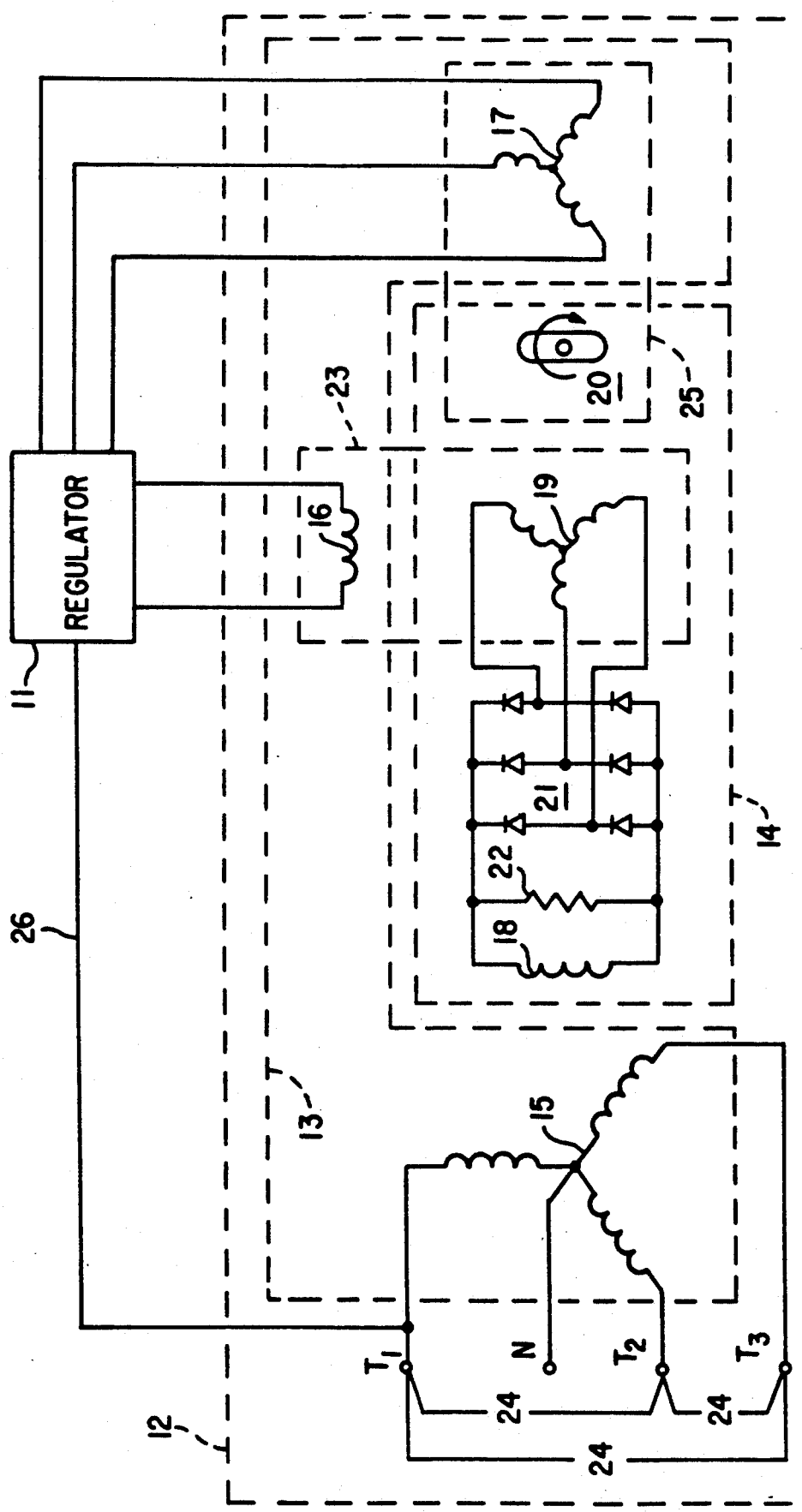
FIG. 1 illustrates the internal components of a prior art, three-in-one brushless ac generator.

FIG. 1 is a schematic illustrating the internal components of a typical, prior art, three-in-one brushless ac generator. A regulator 11 is included as part of this schematic because of its role in regulating the output of ac generator 12. Ac generator 12 comprises stator 13 and rotor 14. Each of these elements is delimited within dashed-line boxes. Stator 13 comprises main stator or main armature 15, exciter stator or exciter field 16 and permanent magnet generator (PMG) stator or PMG armature 17. Rotor 14 comprises of main field 18, exciter armature 19 and PMG field 20. Rotating diode assembly comprising rectifier bridge 21 and shunt resistor 22 connects exciter armature 19 to main field 18 and is used to rectify the ac power of the exciter 23 into dc. This power is used to erect the magnetic field in rotor 14. Shunt resistor 22 is placed across main field 18 to suppress severe voltage spikes appearing across rectifier bridge 21 caused by the induction of main field 18.

A brief description of the operation of ac generator 12 follows. Power generation starts at PMG armature 17 whose conductors are traversed by the rotating magnetic field set up by PMG field 20. The ac power produced in PMG armature 17 is fed to regulator 11 where it is rectified to dc, conditioned and fed to exciter field 16 according to the level of output voltage 24 sensed by sensing lead 26. Voltage 24 is the voltage found between terminals $T_1$-$T_2$, $T_2$-$T_3$ or $T_1$-$T_3$ where $T_1$ represents phase A, $T_2$ represents phase B and $T_3$ represents phase C of main armature 15. The neutral terminal of main armature 15 is identified as N. The direct current delivered thus to exciter 23 is used to set up a magnetic field in stator 13 of ac generator 12. It is intersected by exciter armature 19 where, as in PMG 25, it produces ac power. This ac power is in turn rectified by rectifier bridge 21 before being used to set up the rotating dc magnetic field in rotor 14. In turn, the field traverses the windings in main armature 15, where the main power is produced at a constant voltage.

Figure 2:
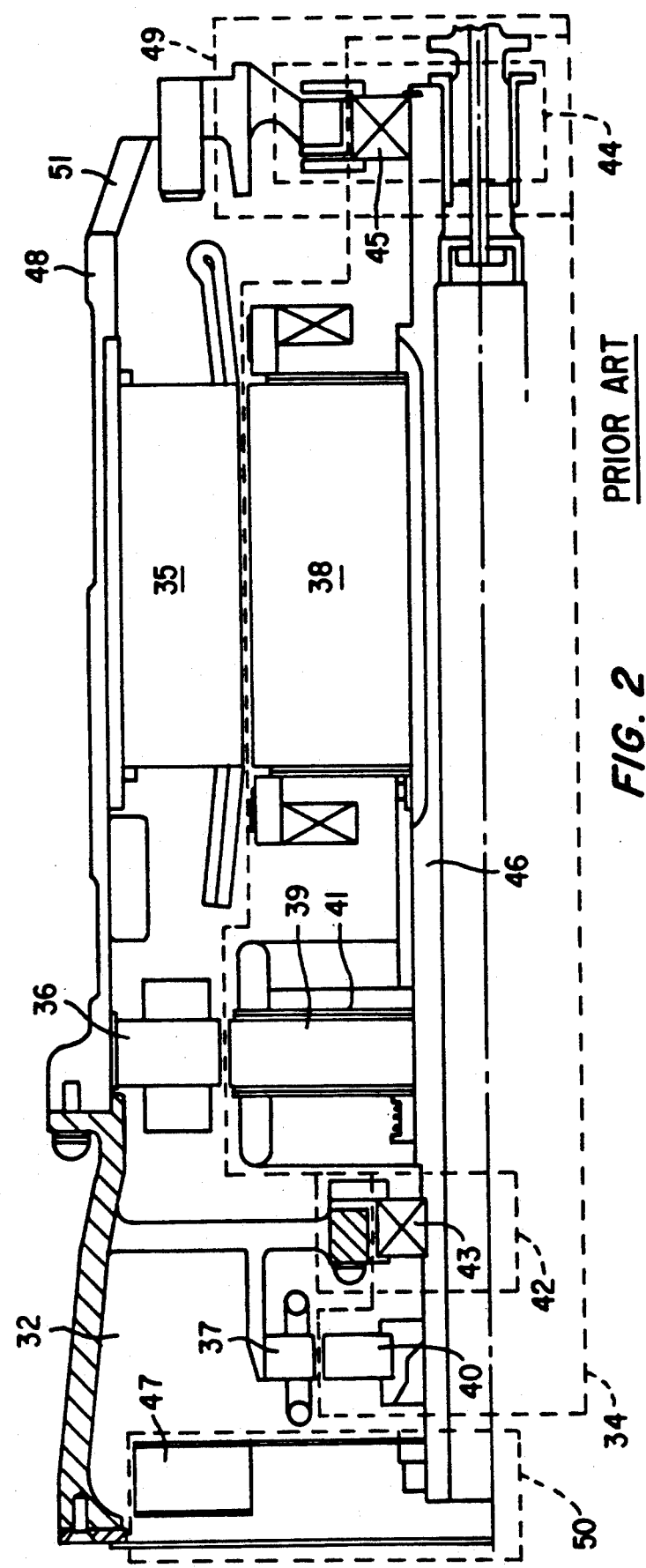
FIG. 2 illustrates a longitudinal cross-section layout of a prior art air cooled ac generator.

FIG. 2 illustrates a longitudinal cross-section layout of a typical, prior art, air cooled generator showing the normal arrangement of its internal components. This figure is explained as follows. Rotor 34 is supported at its anti-drive end (ADE) 42 by bearing 43 and at its drive end (DE) 44 by bearing 45. Rotor 34 comprises common shaft 46, main field 38, exciter armature 39 and PMG field 40, all mounted on common shaft 46. Rotating diode assembly 41 is mounted within exciter armature 39. Also supported by common shaft 46 is fan 47. The stator is mounted within generator envelope 48, consisting of one or more housings. The stator comprises main armature 35, exciter field 36 and PMG armature 37.

Cooling air, impelled by fan 47, enters ac generator 32 at its anti-drive end 50 and exits at drive end 49. Throughout ac generator 32, air is directed to impinge first upon PMG armature 37, PMG field 40 and anti-drive end bearing 43. It then cools rotating diode assembly 41, exciter armature 39 and exciter field 36. Next, the air is made to cool the anti-drive end side winding of main armature 35 and main field 38. The stator air then passes around main armature 35, through a stand-off cage, to contact and cool the drive end side winding of main armature 35 and main field 38. Meanwhile, rotor air passes between main field 38 poles, and through shaft channels 61 to cool main field drive end side winding, as well as drive end bearing 45. Having absorbed the heat produced by generator losses, the air then exits generator envelope 48 through drive end housing vents 51.

Figure 3:
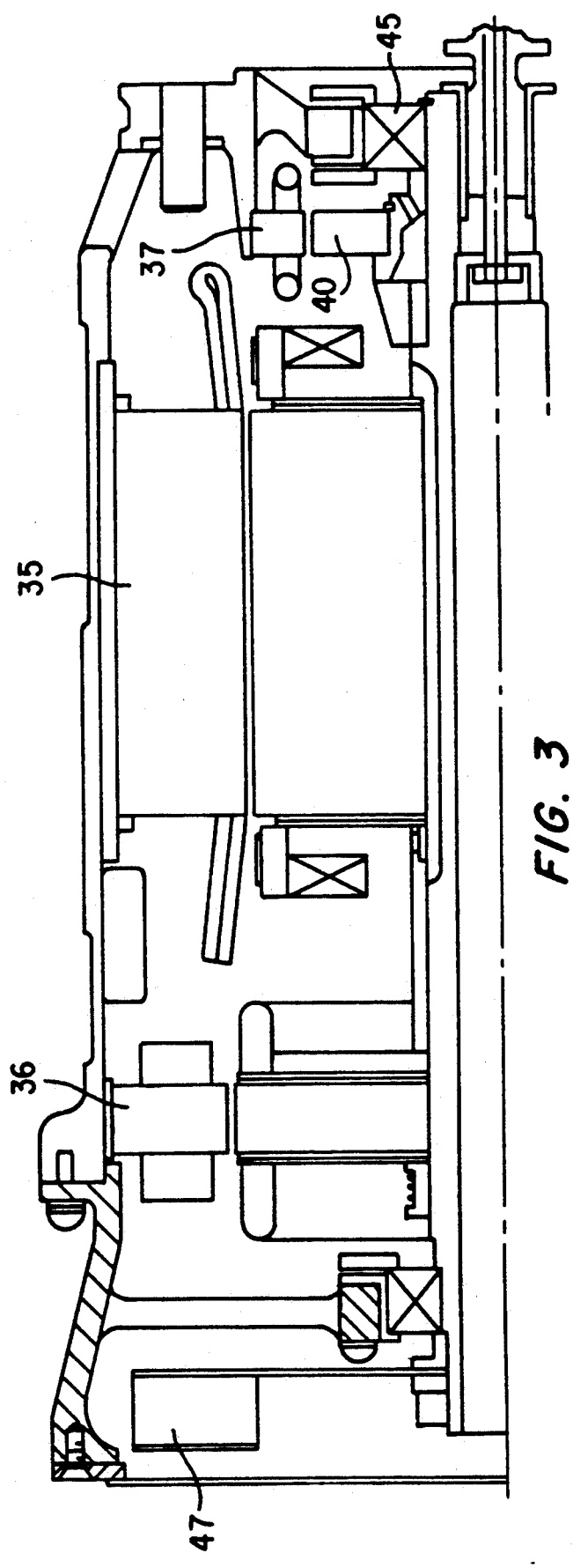
FIG. 3 illustrates a longitudinal cross-section layout of a rearranged air cooled ac generator.

FIG. 3 illustrates a longitudinal cross-section layout of a similar air cooled generator having internally rearranged components so as to reduce length. Note the reduced space between fan 47 and exciter field 36 of FIG. 3 as compared to the space between fan 47 and exciter field 36 of FIG. 2. In order to minimize the overall length, PMG armature 37 and PMG field 40 are relocated to the drive end where they can be placed under the drive end side winding of main armature 35. A more efficient space utilization is thus achieved. However, because PMG field 40 now obstructs the passage of air to drive end bearing 45, drive end bearing 45 will overheat if no provisions are made to cool it.

FIG. 4 illustrates a longitudinal cross-section of one embodiment of the present invention. In order to allow cooling air to impinge upon drive end bearing 45 and thus cool it, a comparatively small air impeller 60 is inserted in the otherwise void space between PMG armature 37, PMG field 40 and main field 38. Air impeller 60 abuts PMG field hub 62, which has also been ported in a direction incident to drive end bearing 45.

Thus, with the inclusion of air impeller 60, enough negative pressure is created at the drive end of main field 38, so that air is pulled through shaft channels 61 and partially propelled under PMG field hub 62, through ports 63, against drive end bearing 45, and finally exits through drive end housing vents 51.

Figure 5A:
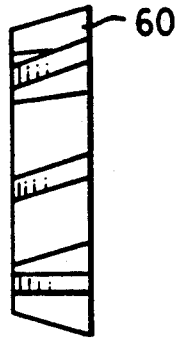
FIG. 5 illustrates details of one embodiment of an impeller utilized in the present invention.
Figure 5B:
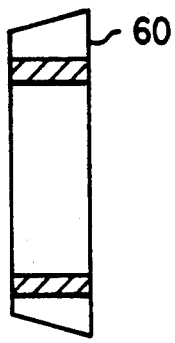
Figure 5C:
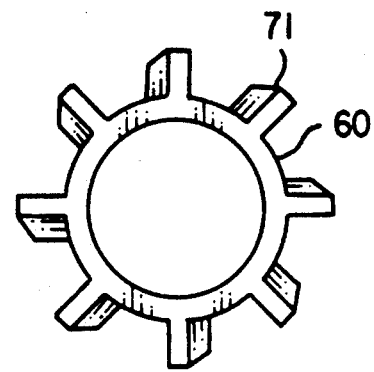

FIG. 5 illustrates details of one embodiment of air impeller 60 utilized in the present invention. Air impeller 60 contains fins 71 designed to move air when air impeller 60 is rotating.

Figure 6A:
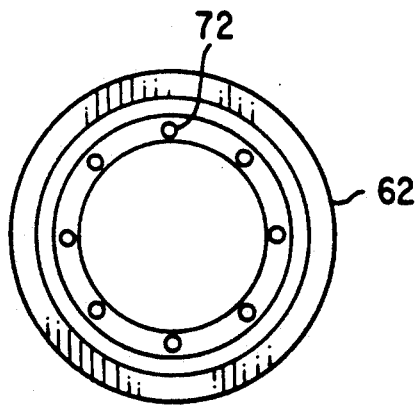
FIG. 6 illustrates one embodiment of a ported permanent magnet generator hub utilized in the present invention.
Figure 6B:
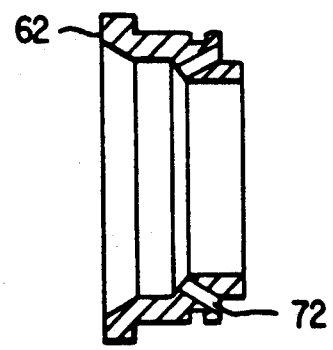

FIG. 6 illustrates details of one embodiment of a ported permanent magnet generator (PMG) field hub 62 utilized in the present invention. Ports 72 are positioned in a direction incident to drive end bearing 45 (not shown).

It is not intended that this invention be limited to the hardward arrangement or operational procedures shown disclosed. This invention includes all of the alterations and variations thereto as encompassed within the scope of the claims as follows.

We claim:

1. A minimum length, air cooled ac generator arrangement, comprising:
    stator means including main armature means, exciter field means and permanent magnet generator armature means;
    rotor means including shaft means, and main field means, exciter armature means and permanent magnet generator field means, all of which are mounted on said shaft means;
    said permanent magnet generator armature means and said permanent magnet generator field means disposed below said main armature means;
    rectifier bridge means connecting said exciter armature means to said main field means for rectifying ac power to provide dc power;
    shunt resistor means disposed across said main field means for suppressing voltage spikes;
    fan means supported on said shaft for circulating air throughout said ac generator arrangement; and
    cooling means for cooling components of said ac generator arrangement otherwise blocked by said permanent magnet generator armature means and said permanent magnet generator field means deposed below said main armature means, said cooling means including air impeller means disposed in a space between said permanent magnet generator armature means, said permanent magnet generator field means and said main field means.

2. A minimum length, air cooled ac generator arrangement as claimed in claim 1 wherein said cooling means further includes:
    a ported permanent magnet generator field hub for supporting said permanent magnet generator field means.

3. A minimum length, air cooled ac generator arrangement as claimed in claim 1 further including:
    drive end housing vent means for allowing air to exit said ac generator arrangement.

4. An improved air cooled ac generator arrangement of the type including stator means having main armature means, exciter field means and permanent magnet generator armature means, and rotor means having shaft means, and main field means, exciter armature means and permanent magnet generator field means, all of which are mounted on said shaft means, said permanent magnet generator armature means and said permanent magnet generator field means disposed below said main armature means so that said stator means and said rotor means are integrated to provide for minimum generator length, the improvement comprising:
    rectifier bridge means connecting said exciter armature means to said main field means for rectifying ac power to provide dc power;
    shunt resistor means disposed across said main field means for suppressing voltage spikes;
    fan means supported on said shaft for circulating air throughout said ac generator arrangement;
    cooling means for cooling components of said ac generator arrangement otherwise blocked by said integrated stator and rotor means; and
    said cooling means including air impeller means disposed in a space between said permanent magnet generator armature means, said permanent magnet generator field means and said main field means.

5. The improvement described in claim 4, wherein said cooling means further includes:
    a ported permanent magnet generator field hub for supporting said permanent magnet generator field means.

6. The improvement described in claim 4, further including:
    drive end housing vent means for allowing air to exit said ac generator arrangement.

* * * * *